(12) United States Patent     (10) Patent No.:   US 12,588,657 B2

Ayers     (45) Date of Patent:    Mar. 31, 2026

(54) STOCK TANK GUARD

(71) Applicant: Courtney Ayers, Ismay, MT (US)

(72) Inventor: Courtney Ayers, Ismay, MT (US)

( * ) Notice: Subject to any disclaimer, the term of this patent is extended or adjusted under 35 U.S.C. 154(b) by 0 days.

(21) Appl. No.: 17/940,273

(22) Filed: Sep. 8, 2022

(65)      Prior Publication Data

US 2024/0081284 A1    Mar. 14, 2024

(51) Int. Cl.
    *A01K 7/02*      (2006.01)

(52) U.S. Cl.
    CPC ................................... *A01K 7/025* (2013.01)

(58) Field of Classification Search
    USPC .... 119/72–81, 51.12, 59, 58, 61.1, 63, 61.3, 119/61.31, 903; D30/119
    See application file for complete search history.

(56)      References Cited

U.S. PATENT DOCUMENTS

| | | | | |
|---|---|---|---|---|
| 1,470,629 | A | * | 10/1923 | Lawhead ................. A01K 5/01 |
| | | | | 119/61.3 |
| 1,506,336 | A | * | 8/1924 | Combellick ............. A01K 7/04 |
| | | | | 119/80 |
| 1,642,304 | A | * | 9/1927 | Lantz ..................... A01K 39/02 |
| | | | | 119/73 |
| 1,887,681 | A | * | 11/1932 | Harris ................... A01K 39/02 |
| | | | | 119/73 |
| 2,084,240 | A | * | 6/1937 | Buckle ................... A01K 39/00 |
| | | | | 119/900 |
| 2,115,817 | A | * | 5/1938 | Lahiere ................ A01K 39/014 |
| | | | | 119/900 |
| 2,477,138 | A | * | 7/1949 | Olson .................. A01K 39/024 |
| | | | | 119/80 |
| 2,652,028 | A | * | 9/1953 | Banks .................... A01K 39/02 |
| | | | | 119/74 |
| 2,724,365 | A | * | 11/1955 | Snider ..................... A01K 7/00 |
| | | | | 119/74 |
| 3,020,881 | A | * | 2/1962 | Strom ..................... A01K 1/10 |
| | | | | 119/58 |
| 3,195,509 | A | * | 7/1965 | McClure ............... A01K 39/02 |
| | | | | 119/74 |
| 4,070,991 | A | * | 1/1978 | Schmiesing ............. A01K 1/10 |
| | | | | 119/58 |
| D275,238 | S | * | 8/1984 | Bunger ........................ D30/131 |

(Continued)

FOREIGN PATENT DOCUMENTS

| | | | | | |
|---|---|---|---|---|---|
| GB | | 2063638 | A | * 6/1981 | ............... A01K 7/00 |

*Primary Examiner* — Andrea M Valenti

(74) *Attorney, Agent, or Firm* — Mitchell J. W. Vap

(57)        ABSTRACT

The herein described Stock Tank Guard is generally comprised of a hanging guard structure situated over an existing livestock water tank. The hanging guard structure is preferably constructed of a plurality of interchangeable members, which can be configured in any shape or size to fit over any existing livestock water tank. The guard structure hangs from a plurality of support poles fixed along the exterior perimeter of the existing livestock water tank. In an alternative embodiment, the guard structure hangs from a frame system comprised of interchangeable members erected around and above the existing livestock tank. The interchangeable member feature of the described invention has the added advantage of being able to package, sell, transport, and erect the apparatus in remote locations without heavy equipment that would be necessary for fixing large steel posts in the ground.

11 Claims, 4 Drawing Sheets

(56)                    References Cited

U.S. PATENT DOCUMENTS

| | | | | |
|---|---|---|---|---|
| 4,930,449 | A * | 6/1990 | Harton ..................... | A01K 1/10 |
| | | | | 119/60 |
| 4,982,702 | A * | 1/1991 | Copps ................... | A01K 29/00 |
| | | | | 119/69.5 |
| 5,779,068 | A * | 7/1998 | Whiten ................ | A47F 5/0892 |
| | | | | 108/107 |
| 6,990,925 | B2 * | 1/2006 | Banks ..................... | A01K 5/01 |
| | | | | 119/61.3 |
| 7,296,584 | B2 * | 11/2007 | Goldwitz ............... | E04H 15/44 |
| | | | | 135/141 |
| 2010/0263597 | A1 * | 10/2010 | Kerns ..................... | A01K 1/10 |
| | | | | 119/60 |

* cited by examiner

301

212

303

213

402

400

214

302

402

400

200

301

STOCK TANK GUARD

CROSS REFERENCE TO RELATED APPLICATIONS

Not Applicable.

STATEMENT REGARDING FEDERALLY SPONSORED RESEARCH OR DEVELOPMENT

Not Applicable.

The Names of the Parties to a Joint Research Agreement

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The presently disclosed apparatus is in the field of livestock water tank guards. Livestock tanks are commonly used to provide a water source to livestock. In general, such livestock tanks are essentially an open tank, constructed of galvanized steel, or concrete. In use, such tanks are generally fed by a water supply connected to a valve, which opens when the water level of the tank goes below the threshold water level desired. As such, livestock tanks common in the prior art operate automatically and require little maintenance. In the western United States, open range livestock ranches can span for thousands of acres. And, often livestock tanks such as those previously described must be placed in remote areas of a ranch to provide a water supply to ranging livestock. Remotely placed livestock tanks can go unchecked for multiple days due to their remoteness.

One problem with remotely placed livestock tanks is the hazard of livestock getting into the tank as livestock would do with a natural water source. Livestock getting into remote tanks can lead to fouling of the water in the remote livestock tank, leading to illness of the livestock drinking from the tank. Young livestock in particular are prone to getting stuck in a tank and unable to get back out. In such situations, young livestock may succumb to the elements or starve if they are not able to get out of the tank. As such, livestock getting into remote water supply tanks can lead to livestock illness and death, which can be very detrimental to a ranching business.

The herein described Stock Tank Guard seeks to solve the problem of livestock getting into remote water supply tanks by providing a hanging, moveable guard structure to allow livestock to access a remote water tank but safely deter such livestock from entering the tank.

BRIEF SUMMARY OF THE INVENTION

The herein described Stock Tank Guard is generally comprised of a hanging guard structure situated over an existing livestock water tank. The hanging guard structure is preferably constructed of a plurality of interchangeable members, which can be configured in any shape or size to fit over any existing livestock water tank. The barrier structure hangs from a plurality of poles fixed along the exterior perimeter of the existing livestock water tank. In an alternative embodiment, the guard structure hangs from a frame system comprised of interchangeable members erected around and above the existing livestock tank. The interchangeable member feature of the described invention has the added advantage of being able to package, sell, transport, and erect the apparatus in remote locations without heavy equipment that would be necessary for fixing large steel posts in the ground.

Once the apparatus is installed, livestock can safely drink from the water tank but are deterred from attempting to enter the tank. Because the guard structure hangs freely, there is some movement, which can occur as livestock push against the structure. This movement allows the livestock to access water in the tank while providing safe feedback to the livestock to avoid entering the tank. The further the guard structure is pushed, the more feedback is provided to the livestock. In another embodiment, the hanging guard structure is further comprised of a spring-loaded door, which opens outward from the interior of the structure and water tank. Said door has the added benefit of allowing a person to enter the tank for maintenance and repairs by opening the door outward. However, said door does not swing inward and would not allow livestock access to the tank.

BRIEF DESCRIPTION OF THE DRAWINGS

FIG. 5 is an end plan view of an alternative embodiment of the Stock Tank Guard utilizing frame system to hang barrier structure from.

DETAILED DESCRIPTION OF THE INVENTION

Figure 1:
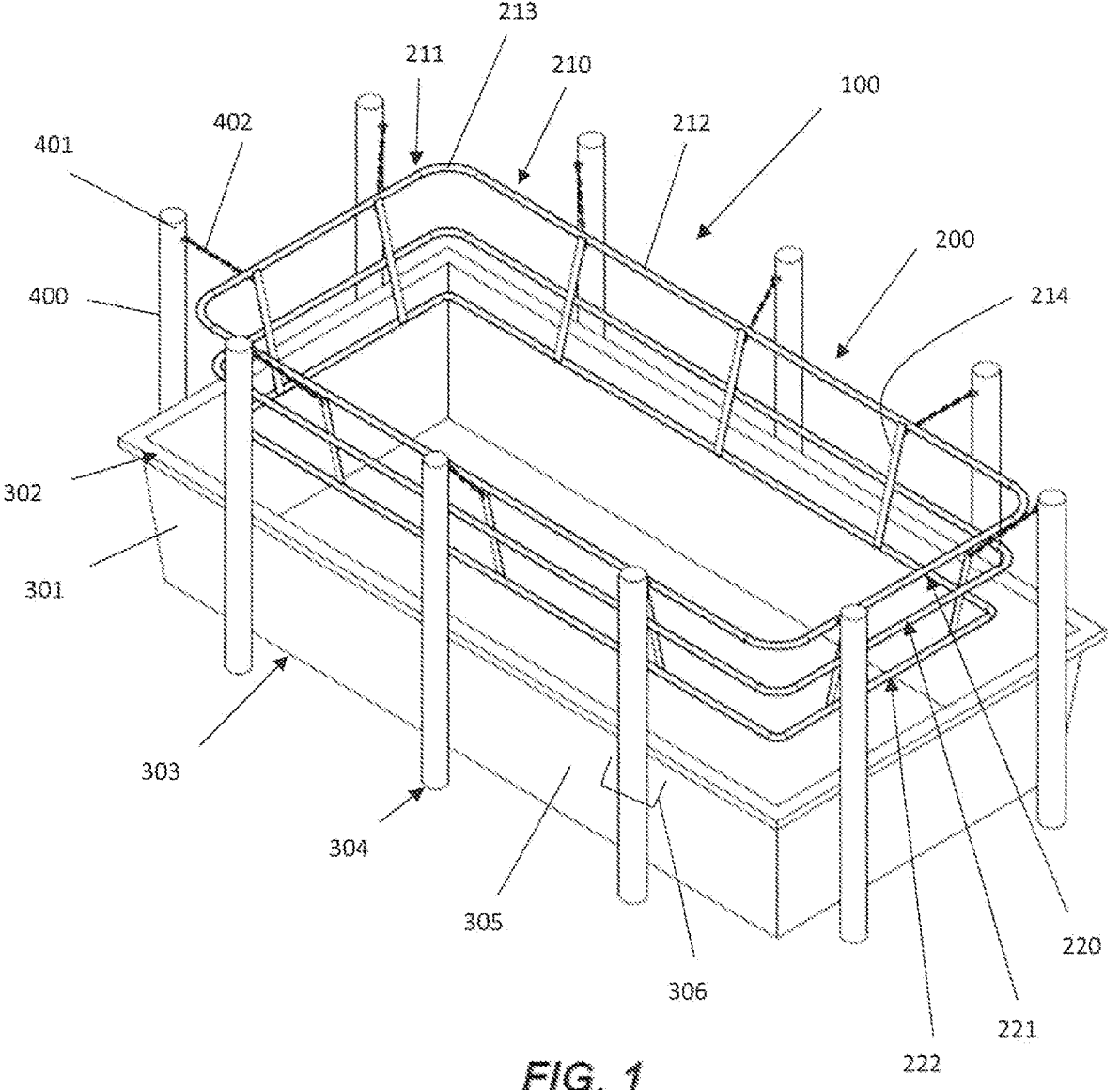
FIG. 1 is a perspective view of the Stock Tank Guard installed over an existing livestock tank.
Figure 2:
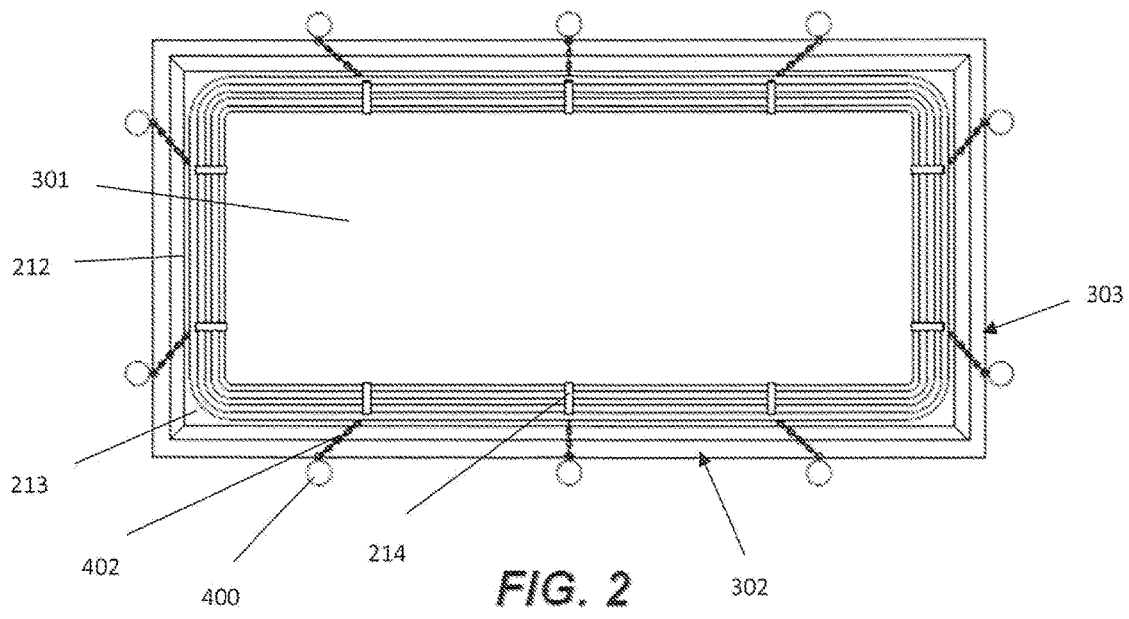
FIG. 2 is an overhead plan view of the Stock Tank Guard showing relationship to perimeter of existing livestock tank.
Figure 3:
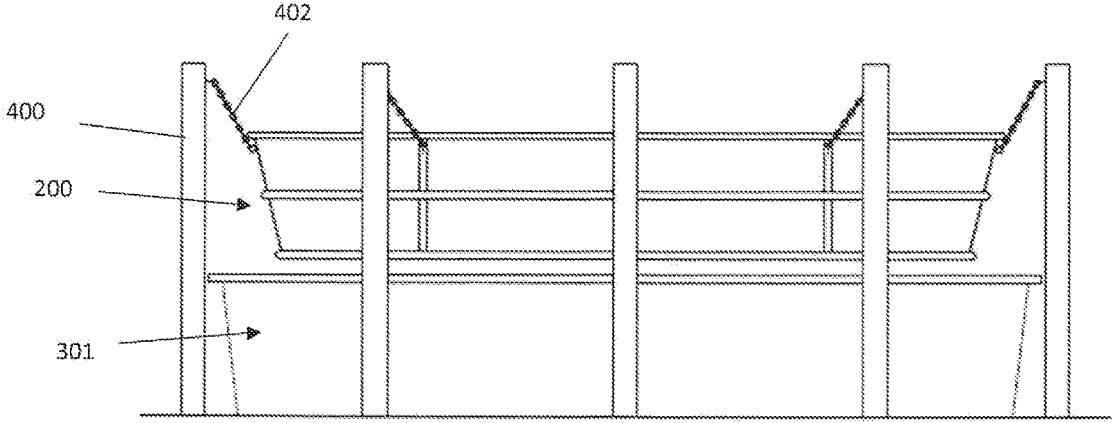
FIG. 3 is a side plan view of the Stock Tank Guard.
Figure 4:
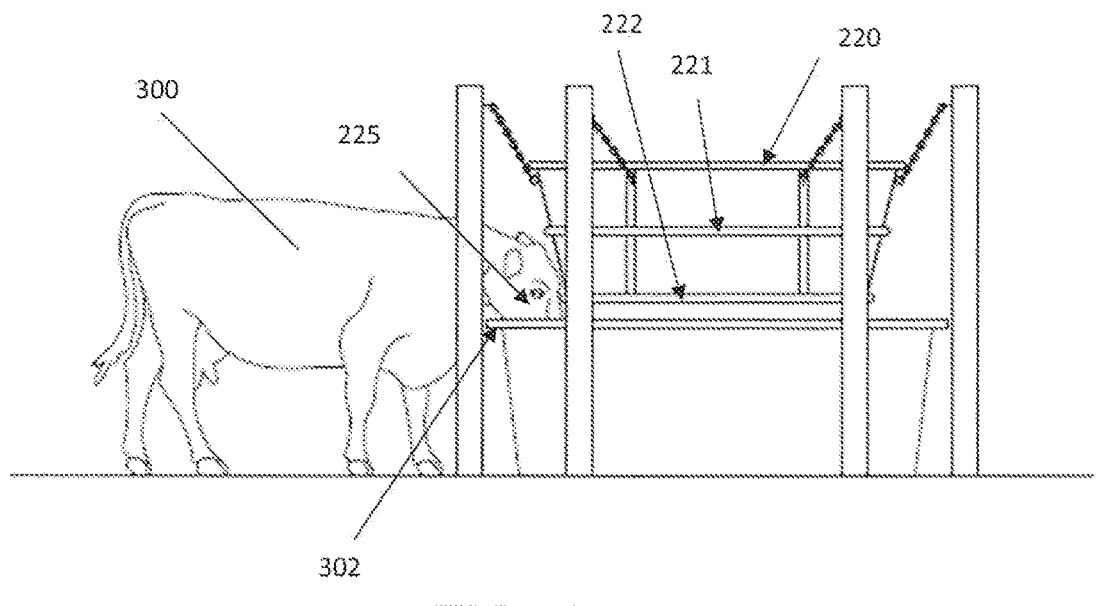
FIG. 4 is an end plan view of the Stock Tank Guard demonstrating livestock accessing water from tank but deterred from entering the tank by the device.

Although only selected embodiments of the invention is explained in detail, the figures and explanations should be understood as illustrations only and are not intended to limit the invention in its scope. Also, in describing the embodiments, specific terminology may be used, but it should be understood that specific terms include all technical equivalents that operate in similar manners to accomplish similar purposes.

The herein described Stock Tank Guard 100 is generally comprised of a hanging guard structure 200 situated over an existing livestock 300 water tank 301. The hanging guard structure 200 is preferably constructed of a plurality of interchangeable guard members 210, which can be configured in any shape or size to fit over any existing livestock water tank 301. The plurality of interchangeable guard members 210 are preferably comprised of tubular steel pipe 211 with corresponding male and female ends to provide a means for simple construction of the guard structure 200 in varying lengths, widths and shapes. To ensure sufficient rigidity of the guard structure 200, said interchangeable guard members 210 are further comprised of a connection means 211 at each end of said interchangeable guard members 210. Preferably, said connection means is comprised of a corresponding male and female end of each interchangeable guard member 210, which is further comprised of a corresponding set of matching holes, wherein when each set of matching holes of each male and female end of said interchangeable guard members 210 are aligned with each other, said holes will accept a bolt through said holes to firmly connect each corresponding male and female end of each interchangeable guard member 210. Said bolt is held in place by installation of a corresponding nut to lock each corresponding interchangeable guard member 210 together. One familiar in the art would recognize that various connection means 211 could be utilized to connect each corresponding male and female end of each interchangeable guard member 210 together. For example, a spring button with corresponding locking hole could be utilized. Welding could be utilized for a permanent rigid construction. Similarly, said barrier structure could be fabricated utilizing continuous materials rather than interchangeable members to effectuate the purpose of the guard structure.

Said guard structure 200 interchangeable guard members 210 further comprise a plurality of straight horizontal interchangeable members 212, 90-degree bend horizontal members 213, and vertical members 214, which serve to connect rows of horizontal members together for rigidity of the guard structure 200. In the preferred embodiment, the guard structure 200 is comprised of a top horizontal row 220, a middle horizontal row 221, and a bottom horizontal row 222. The shape and diameter of the top horizontal row 220 in the horizontal plane is approximately equal to the top border 302 of said existing water tank 301. The shape and diameter of said middle horizontal row 221 in the horizontal plane comprises a diameter less than the diameter of said top horizontal row 220. The shape and diameter of said bottom horizontal row 222 in the horizontal plane comprises a diameter less than the diameter of said middle horizontal row 221. The subsequent decreased diameters of said top, middle, and bottom horizontal rows in the horizontal plane creates a space 225 between said bottom horizontal row 222 and the top border 302 of said water tank 301, in which livestock 300 can access water inside of said water tank 301. In the preferred embodiment, the vertical spacing between each horizontal row is approximately 10 inches. One familiar in the art would recognize that said guard structure 200 could be configured to fit any size or shape of water tank 301. For example, horizontal members as described herein could be comprised of curved members, which when assembled would accommodate a round water tank. Similarly, combinations of curved horizontal members and straight horizontal members could be combined to accommodate a water tank with straight sides and rounded ends.

In the preferred embodiment, the guard structure 200 hangs from a plurality of support poles 400 fixed along the exterior perimeter 303 of the existing livestock water tank 301. Said poles can be anchored into the ground 304 adjacent to the exterior perimeter 303 of said water tank 301. Alternatively, said poles could be fixed to the outside wall 305 of said water tank 301 with standard hardware 306 such as brackets, bolts, nuts, etc. Said guard structure 200 is preferably hung from the top end 401 of said support poles 400 by a plurality of chain lengths 402, which are each individually secured to said top horizontal row 220 members. One familiar in the art would recognize that any material capable of supporting the tensile load of said guard structure could be utilized to hang said guard structure from said support poles. Examples of such materials would include steel cable, wire, rope, etc.

Figure 5:
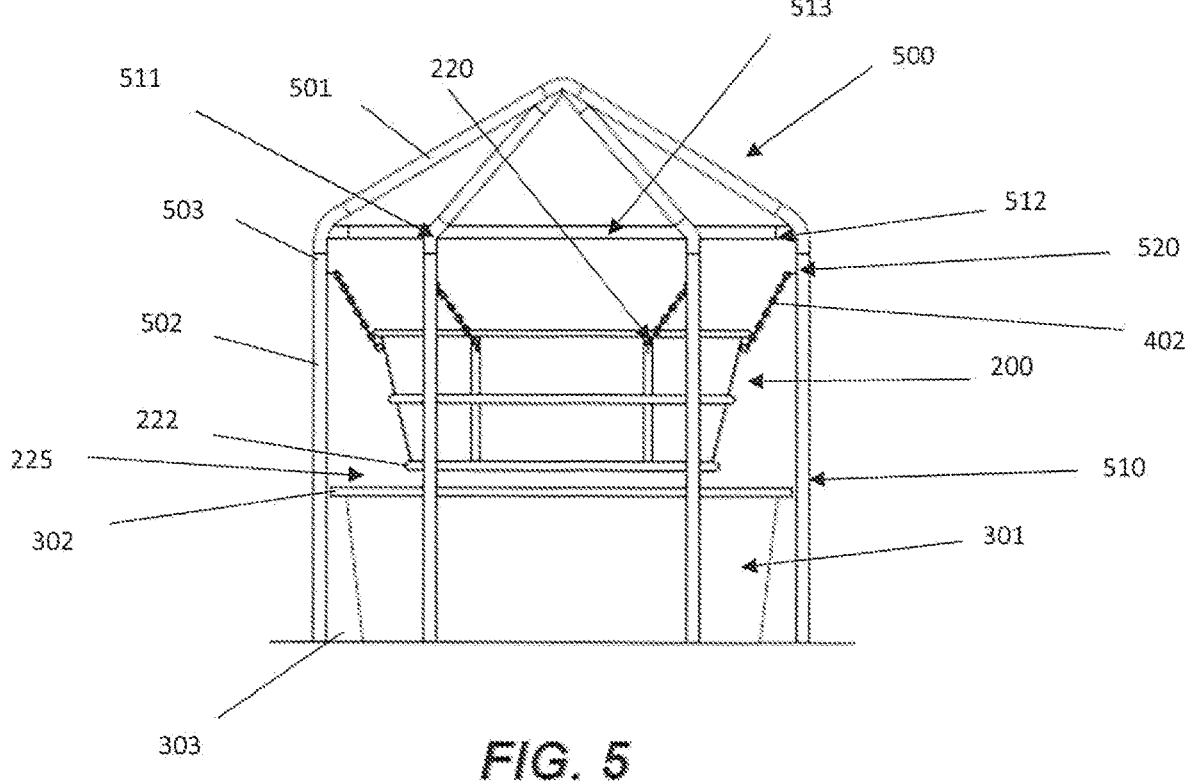

In an alternative embodiment, the guard structure 200 hangs from said support poles 400 further comprising a frame system 500 as shown in FIG. 5. Said frame system 500 is comprised of interchangeable frame members 501 erected around and above the existing livestock water tank 301. Said frame system 500 is preferably constructed of a plurality of interchangeable frame members 501, which can be configured to erect said frame system 500 over any existing livestock water tank 301. The plurality of interchangeable frame members 501 are preferably comprised of tubular steel pipe 502 with corresponding male and female ends to provide a means for simple construction of the frame system 500 in varying heights, lengths, widths, and shapes. To ensure sufficient rigidity of the frame system 500, said interchangeable frame members 501 are further comprised of a connection means 503 at each end of said interchangeable frame members 501. Preferably, said connection means is comprised of a corresponding male and female end of each interchangeable frame member 501, which is further comprised of a corresponding set of matching holes, wherein when each set of matching holes of each male and female end of said interchangeable frame members 501 are aligned with each other, said holes will accept a bolt through said holes to firmly connect each corresponding male and female end of each interchangeable frame member 501. Said bolt is held in place by installation of a corresponding nut to lock each corresponding interchangeable frame member 501 together. One familiar in the art would recognize that various connection means 503 could be utilized to connect each corresponding male and female end of each interchangeable frame member 501 together. For example, a spring button with corresponding locking hole could be utilized. Welding could be utilized for a permanent rigid construction. Similarly, said frame system 500 could be fabricated utilizing continuous materials rather than interchangeable members to effectuate the purpose of the frame system.

Said frame structure 500 interchangeable frame members 501 further comprise a plurality of straight vertical interchangeable frame members 510, 45-degree frame members 511, "T" frame member connectors 512, and horizontal frame members 513. In this embodiment, the frame structure 500 is comprised of a plurality of vertical interchangeable frame members 510 set vertically along the exterior perimeter 303 of the existing livestock water tank 301. A bottom end of 45-degree frame members 511 are connected to each top end of each vertical interchangeable frame member 510. A bottom end of an interchangeable frame member 501 is then connected to each top end of said 45-degree frame members 511, wherein the top ends of opposing interchangeable frame members 510 are connected by 45-degree frame members 511, to increase the rigidity of said frame structure 500. To further increase rigidity of said frame structure 500, "T" frame member connectors 512 can be used to connect horizontal frame members 513 to said vertical interchangeable frame members 510 to provide horizontal cross bracing of said frame structure 500. On familiar in the art would recognize that said frame structure 500 components could be configured in virtually any shape and size to construct a frame capable accomplishing the function of said frame structure 500.

In this embodiment, the guard structure 200 hangs from said vertical interchangeable frame members 510, which have been rigidly constructed into said frame structure 500 around the exterior perimeter 303 and over the existing livestock water tank 301. Said guard structure 200 is preferably hung from the top end 520 of said vertical interchangeable frame members 510 by chain 402, which is secured to said top horizontal row 220 members. In this embodiment, said guard structure 200 is hung so the subsequent decreased diameters of said top, middle, and bottom horizontal rows in the horizontal plane creates a space 225 between said bottom horizontal row 222 and the top border 302 of said water tank 301, in which livestock 300 can access water inside of said water tank 301.

The interchangeable member feature of the described invention has the added advantage of being able to package, sell, transport, and erect the apparatus in remote locations without heavy equipment that would be necessary for fixing large steel posts in the ground. Furthermore, the interchangeable member feature of the described invention has the added advantage of the interchangeable members being custom fabricated off site to any dimension and shipped to the site to be used in packaging manageable without heavy machinery. Once the component package is delivered to the site of use, the guard structure and/or the frame structure can be erected for use.

Figure 6:
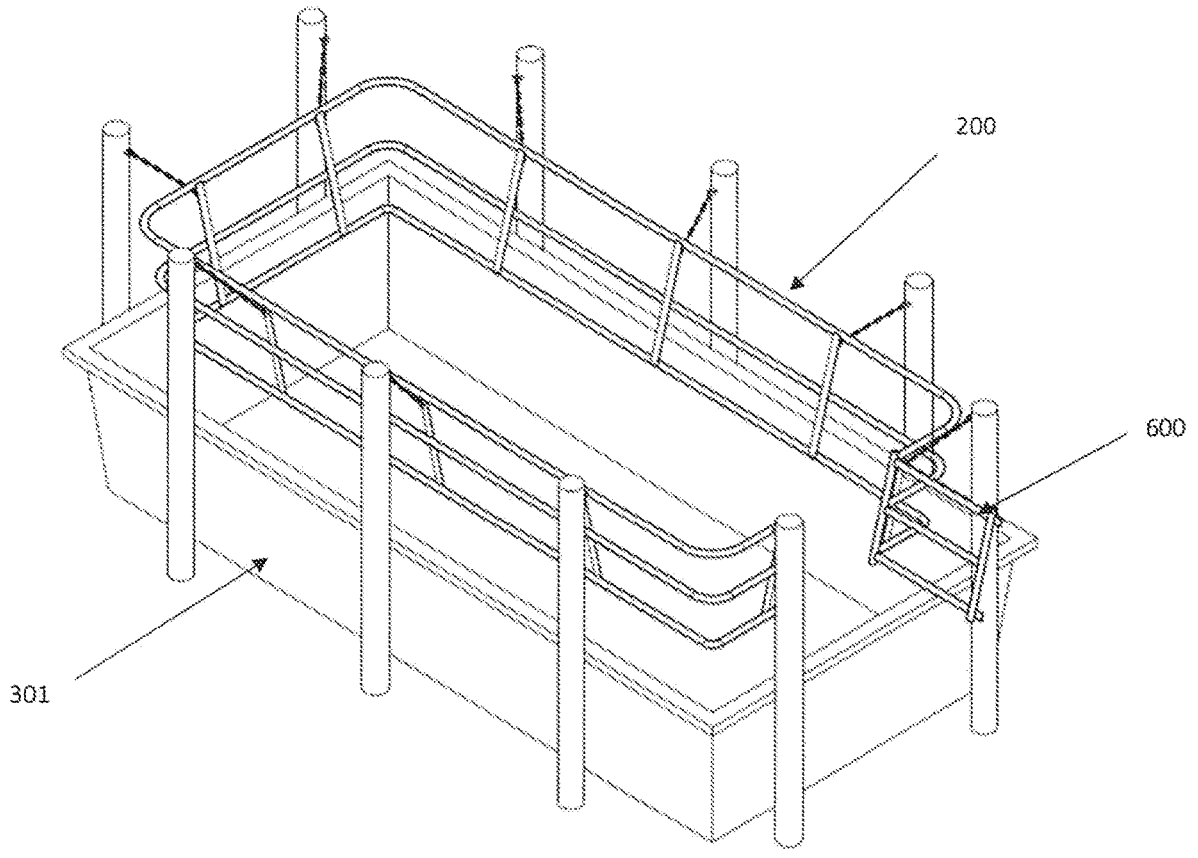
FIG. 6 is a perspective view the Stock Tank Guard showing outward swinging door embodiment.

In another embodiment, the hanging guard structure 200 is further comprised of a spring-loaded door 600, which opens outward from the interior of the guard structure 200 and water tank 301 as shown in FIG. 6. Said spring-loaded door has the added benefit of allowing a person to enter the tank for maintenance and repairs by opening the door outward. However, said door does not swing inward and would not allow livestock 300 access to the tank.

It is understood that the foregoing examples are merely illustrative of the present invention. Certain modifications of the articles and/or methods may be made and still achieve the objectives of the invention. Such modifications are contemplated as within the scope of the claimed invention. For example, one skilled in the art would recognize that the invention herein could be comprised of many different configurations, shapes, and sizes to effectuate the invention.

What is claimed is:

1. A stock tank guard comprising:

A. A plurality of support poles fixed along an exterior perimeter of an existing livestock water tank;

B. A guard structure comprised of a plurality of interchangeable guard members, wherein said guard structure hangs freely from said plurality of support poles by a plurality of separate lengths of material capable of supporting tensile load; wherein each separate length of material is directly connected to a top end of said plurality of support poles and a top horizontal row of said plurality of interchangeable guard members, wherein said top horizontal row in the horizontal plane comprises a shape and diameter approximately equal to a shape and diameter of a top border of said exiting livestock water tank; and C. Said guard structure is situated over said existing livestock water tank, which creates a space between a bottom horizontal row of said guard structure and said top border of said livestock water tank for a livestock animal to access water in said livestock water tank; wherein D. Said guard structure moves to allow said livestock animal to access said water in said livestock water tank but deters said livestock animal from entering said livestock water tank.

2. The stock tank guard of claim 1, wherein said plurality of interchangeable guard members are comprised of tubular steel pipe with corresponding male and female ends.

3. The stock tank guard of claim 1, where said guard structure is comprised of said top horizontal row, a middle horizontal row, and a said bottom horizontal row.

4. The stock tank guard of claim 3, wherein a shape and diameter of said middle horizontal row comprises a diameter less than the diameter of said top horizontal row, a shape and diameter of said bottom horizontal row comprises a diameter less than the diameter of said middle horizontal row, wherein a subsequent decrease in said diameters of said top, middle, and bottom horizontal rows creates said space between said bottom horizontal row and said top border of said livestock water tank.

5. The stock tank guard of claim 1, wherein said support poles are anchored into the ground adjacent to said exterior perimeter of said existing livestock water tank.

6. The stock tank guard of claim 1, wherein said support poles are fixed to an outside wall of said existing livestock water tank.

7. The stock tank guard of claim 1, wherein said support poles further comprise a frame system.

8. The stock tank guard of claim 7, wherein said frame system is comprised of a plurality of interchangeable frame members erected around and above said existing livestock water tank.

9. The stock tank guard of claim 8, wherein said plurality of interchangeable frame members are comprised of tubular steel pipe with corresponding male and female ends.

10. The stock tank guard of claim 1, wherein said guard structure is further comprised of a spring-loaded door, which opens outward from an interior of said guard structure.

11. The stock tank guard of claim 1, wherein said plurality of separate lengths of material capable of supporting tensile load is comprised of a plurality of chain lengths.

* * * * *